United States Patent Office 3,449,629
Patented June 10, 1969

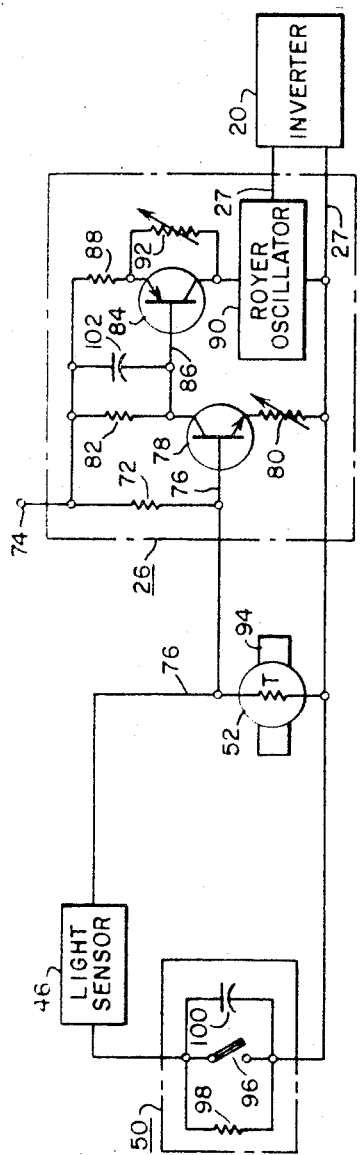
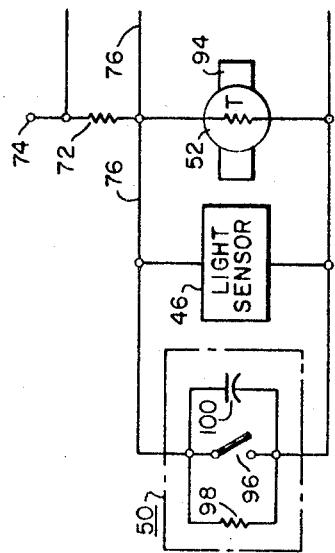
FIG. 2.
FIG. 3.

3,449,629
LIGHT, HEAT AND TEMPERATURE CONTROL SYSTEMS
John W. Wigert, Berea, Ohio, and Laban E. Lesster, Pittsburgh, Pa., assignors to Westinghouse Electric Corporation, Pittsburgh, Pa., a corporation of Pennsylvania
Continuation of application Ser. No. 486,284, Sept. 10, 1965. This application May 16, 1968, Ser. No. 731,675
Int. Cl. H05b 37/02, 39/04, 41/36
U.S. Cl. 315—151　　　　　　　　　　　　　8 Claims

ABSTRACT OF THE DISCLOSURE

A room is controlled both with respect to temperature and lighting level by varying the energization of the lighting load. This is accomplished by separate temperature and lighting level sensors which act to control the power level to the lighting load. In the preferred circuit, the sensors control the frequency of a variable-frequency oscillator, which in turn controls the rate of switching of an inverter. This rate of switching, in turn, controls the power input to the lighting load.

---

Figure 1:
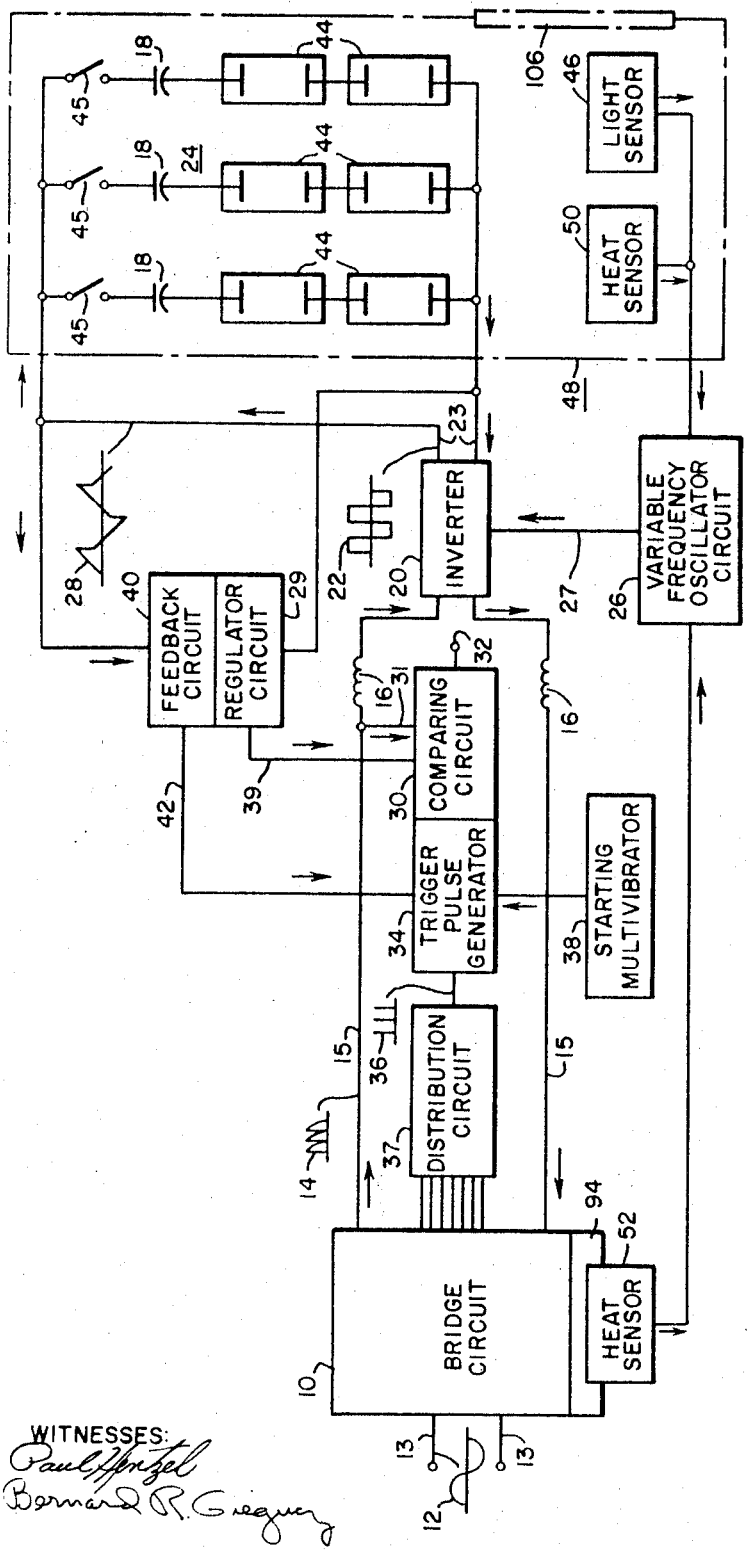

This application is a continuation of application Ser. No. 486,284, filed Sept. 10, 1965 for Light, Heat and Temperature Control Systems by John W. Wigert and Laban E. Lesster and owned by the present assignee, which application is now abandoned.

This invention relates generally to control systems and more particularly to power supply circuits wherein the power level of operation is a function of the frequency of the output current.

Heretofore controlled power supplies have had a power amplifier for supplying power to a load. An oscillator was provided which was responsive to some parameter of the load (or the power supply circuit) such as the temperature thereof. As the temperature changed, the resulting deviations in oscillator frequency were converted into direct voltages by means of a discriminator. These direct voltages were applied to the power amplifier to control the power to the load. Regulation was provided because the oscillator was continuously responsive to changes in the temperature continuously correcting them, thus stabilizing the temperature. Temperature adjustment was accomplished by manually changing the frequency of the oscillator. As a general rule, the more circuits there are in such a system, the higher is its cost and the lower is its reliability. It is therefore desirable to eliminate the discriminator from the above described regulating circuit.

It is known to use circuits, as described above to regulate the temperature of an enclosed area such as an oven or room. It is further known to provide controlled light sources in a room near the windows having light intensities which vary inversely as the level of available sunlight varies. Such illumination systems vary the lighting load to provide cheaper and more constant illumination. It is desirable to achieve like economies in the heating and air conditioning systems of the room.

It is therefore an object of this invention to provide a variable frequency control system having improved cost and reliability characteristics.

It is a further object of this invention to provide a variable frequency control system which does not include a discriminator circuit.

It is another object of this invention to provide a control system having a periodic output current the magnitude of which is a function of the period thereof.

It is an additional object of this invention to provide a variable frequency power supply circuit for regulating the temperature of the circuit or the load.

It is still a further object of this invention to provide a lighting system which minimizes the heating load of furnaces during the winter and minimizes the cooling load of air-conditioners during the summer in addition to minimizing the lighting load the year round.

Briefly, these and other objects are achieved by providing a variable output power supply circuit having a variable frequency periodic output current for energizing light sources, preferably of the gaseous discharge type. A capacitor is provided in the output circuit of the power supply which charges first in one direction for one-half cycle and then the other in accordance with the flow of the periodic output current. A voltage regulator is provided which limits the peak voltage developed across the capacitor. The regulator controls the duty cycle of an input bridge switching circuit within the power supply. A rectifying bridge switching circuit controls the power supply output current to a level just sufficient to charge the capacitor to the regulated peak value within each one-half cycle charging period. A variable frequency oscillator is provided which controls the frequency of the output current. The oscillator has a manual adjustment for smoothly adjusting the frequency of operation. This changes the charging period allowed for the capacitor and forces the regulator to vary the output current level so that it can charge the capacitor to the same peak value within the new charging period. The magnitude of the output current is directly proportional to the frequency thereof. Circuit heat sensors are provided proximate to the circuit which are responsive to the circuit temperature. These circuit heat sensors automatically control the frequency of the oscillator to regulate the circuit temperature. Changes in the temperature of the circuit or circuit components are continuously detected by these sensors. The circuit output frequency and power level is smoothly adjusted by the sensors and oscillator in response to changing conditions in the circuit and the load. Additional light and heat sensors are provided disposed in the illuminated region. These additional sensors automatically control the frequency of the oscillator to regulate the ambient light intensity and temperature of the room illuminated by the light sources. The light sensor will cause the intensity of the lamps to vary as the contribution of the sunlight to the room changes. The heat sensor will have a similar effect as the combined heat from the sun, the lamps, and other sources in the room vary. In the winter the heat generated by the lamps supplement the heating facilities of the building. Under milder climatic conditions the heat from the lamps may entirely replace these heating facilities. During the summer months increased sunlight through the windows allows a lower lamp intensity and power level. Accordingly, the lamps radiate less heat into the room. The heat producing infrared portion of the sun's spectrum is at least partially absorbed by the glass in the windows and decreases the heat contributed to the room by the sunlight. By adding the sunlight to the system in the summer and reducing the light generated by the lamps, the heat entering the room is diminished. The air-conditioning requirements of the building are decreased accordingly. The cost of artificial lighting decreases year-round in accordance with the amount of sunlight employed.

Further objects and advantages of the invention will become apparent, and features of novelty which characterize the invention will be pointed out in particularity in the following detailed description.

For a better understanding of the invention reference may be had to the accompanying drawings wherein:

FIG. 1 shows a complete lighting system and illuminated region which incorporate the invention;

FIG. 2 shows a detail circuit of the light sensor 46, region heat sensor 50, circuit heat sensor 52, and the frequency determining portion of the variable frequency oscillator 26 shown in FIG. 1; and FIG. 3 shows a parallel embodiment of light sensor 46 and region heat sensor 50.

Referring specifically to the figures, FIG. 1 shows a block diagram of a high-frequency lighting system which incorporates the invention. The waveforms appearing in the system are conveniently located on the diagram and identified with reference numerals. The flow of current and/or information is indicated by arrows adjacent to the circuit leads. A conventional variable duty cycle input rectifier bridge circuit 10 is shown which converts the single phase or three phase AC 12 at input 13 into phase controlled pulsating DC 14. The bridge 10 preferably provides full wave rectification, however half wave rectifying bridge may be employed. The input switching elements employed in the bridge 10 are preferably thyristors (SCR's) because of the heavy currents that must be conducted and switched; however, other switching devices may be employed. The pulsating DC 14 is provided to the bridge output conductors 15 and is filtered by inductors 16 which are serially connected in conductors 15. An inverter 20 inverts the filtered DC into a high-frequency, preferably, square wave output current 22 which is applied across a lighting load 24 through inverter output conductors 23. The capacitive nature of the load 24 causes the square wave current 22 to appear as a sawtooth type voltage 28 across the load 24. The load capacitors 18 charge each half-cycle to a peak voltage determined by a regulator circuit 29 which is connected across the inverter output conductors 23. The frequency of the square wave current 22 is controlled by a variable frequency oscillator 26 which is connected to the inverter 20. The frequency may be varied, for example, from 1 kc. to 4 kc. to establish the desired range of output current magnitude and lamp intensity.

In order to trigger the bridge 10 and the duty cycle thereof, the pulsating DC 14 therefrom is applied to a comparing circuit 30, which is connected to the bridge output lead 15 through a comparing circuit input lead 31. The comparing circuit 30 compares a voltage developed by the pulsating DC 14 to a reference potential 32. Each cycle, the developed voltage becomes equal to, and passes through, the value of the reference potential 32, and causes a trigger pulse generator 34 to provide a trigger pulse. This sequence of trigger pulses 36 which is synchronized with the input AC is applied to all of the input switching elements of the bridge 10 simultaneously through a distribution circuit 37. The power level of the DC 14 is adjusted by controlling the phase-displacement between the trigger pulses 36 and the input AC 12 by means of the comparing circuit 30 and trigger pulse generator 34. The usual method is to vary the value of the reference potential 32. The phase-displacement is ultimately controlled by the regulator circuit 29 through feedback path 39. The phase-displacement varies the duty cycle or conduction angle of the bridge 10 input switching elements. For a more detailed explanation of the triggering mechanism for the bridge 10 reference should be had to a copending application Ser. No. 486,283, filed concurrently herewith by L. E. Lesster and R. R. Pelly, entitled "An Improved Firing Circuit," and now issued as U.S. Patent 3,363,141.

A starting multivibrator 38 is provided for initially starting the bridge 10. The multivibrator 38 is connected to the trigger pulse generator 34 and initiates the trigger pulse output. The normal trigger pulses 36 cannot be obtained until the bridge 10 has an output which affects the comparing circuit 30 and activates the trigger pulse generator 34.

A feedback circuit 40 is provided across the inverter 20 in parallel with the load 24 to protect the system against load short circuits. The feedback circuit 40 is responsive to the periodic characteristic of the square wave current 22 and sawtooth type voltage 28, and can eliminate the trigger pulse output 36 of pulse generator 34 through feedback path 42. In the event of a short circuit in the load 24, the feedback device 40 will not receive the periodic component and will prevent the bridge 10 from conducting current to the load 24 by removing the trigger pulses 36. For a more detailed description of this short circuit protection feature, reference should be had to copending application Ser. No. 486,285, filed concurrently herewith, by L. E. Lesster, entitled "Excessive Current Protection Device," and assigned to the present assignee.

The light intensity of the fluorescent lamps 44 depends on the current level therethrough and is controlled by varying the frequency of the oscillator 26 which controls the frequency of the square wave current 22 as described in copending application Ser. No. 403,814, filed Oct. 14, 1965, by A. H. B. Walker, now abandoned, and assigned to the present assignee. The oscillator 26 is connected to the inverter 20 through oscillator output leads 27. A light sensor 46, connected to the variable frequency oscillator 26, is disposed in the region 48 which is illuminated by the lamps 44. Region 48 is a room or enclosure provided with windows or openings 106 which permit the entry therein of solar radiations of light and heat. The light sensor 46 detects changes in the ambient light level of the region 48, which are mainly due to variations in the sunlight, and adjusts the frequency of the oscillator 26 to increase or decrease the lamp current and change the light intensity of the lamps 44 accordingly. Similarly, a region heat sensor 50 is connected to the oscillator 26 and disposed in the illuminated region 48. The heat sensor 50 regulates the temperature of the illuminated region 48. The sensors may be set for a desired light level or temperature by the people in the region 48. An additional heat sensor 52 is provided disposed in heat transfer relation with the input switching elements in the bridge 10. This bridge sensor 52 detects the operating temperature of the switching elements and prevents them from overheating.

FIG. 2 shows a detailed schematic view of the circuit of the variable frequency oscillator 26 and its relation to sensors 46, 50 and 52 which are described briefly here. A voltage dividing network is formed including a fixed voltage developing resistor 72 and sensors 46, 50 and 52 connected in series therewith. In this embodiment the sensors are arranged in parallel branches. The bridge heat sensor or temperature detector 52 comprises one branch and the light sensor 46 and the region heat sensor 50 comprises the other branch. Other arrangements are possible, one of which will be discussed in reference to FIG. 3. A DC supply 74 is connected across the voltage dividing network referred to above. The midpoint of the voltage dividing network is connected to the base of amplifying transistor 78 through base lead 76. Variations in the resistance of the sensors 46, 50 and 52 cause a voltage signal to appear on the base lead 76 which is amplified by the amplifier transistor 78. A gain control resistor 80 is connected to the emitter of the transistor 78 to control the gain thereof. Power is provided to the transistor 78 from the DC supply 74 through the collector resistor 82. The output of transistor 78 is applied to the base of frequency control transistor 84 by means of base lead 86 which connects the collector of amplifying transistor 78 to the base of control transistor 84. The emitter of control transistor 84 is connected to the DC supply 74 through emitter resistor 88. The collector of transistor 84 is connected to a conventional Royer type oscillator indicated by the block 90. The frequency output of the oscillator 90 depends on the voltage applied thereacross which in turn is a function of the current through frequency control transistor 84. The output of the Royer oscillator 90 is applied to the inverter 20 through oscillator output leads 27 to control the frequency of the current applied to the load 24. A frequency control potentiometer 92 is connected across the control transistor 84 and is manually operable to vary the voltage across the Royer oscillator 90. The potentiometer 92 is most effective when the control transistor 84 has a high impedance due to the signal on the base thereof. The potentiometer 92 determines the lowest frequency and lowest light intensity for the system. Other methods dimming the lamps 44 are possible.

Briefly summarizing the operation of the variable frequency oscillator circuit 26, the sensors 46, 50 and 52 provide a signal which is amplified by amplifier transistor 78 and applied to the base of control transistor 84. The current through control transistor 84 varies in accordance with the sensor signal. The saturating core Royer oscillator 90 porvides a periodic signal to the inverter 20 having a frequency which is responsive to the control transistor 84 and current which decreases as the resistance of the sensors decrease. The sensitivity of the oscillator 90 to the change in sensor resistance may be increased by increasing the gain of amplifier transistor 78. The Royer oscillator 90 frequency and the lamps 44 intensity may be varied by varying the control or lamp dimming resistor 92.

The bridge heat sensor 52 may be used to regulate the temperature of the bridge components or it may be used simply to prevent the bridge temperature from exceeding a predetermined maximum value. The sensor 52 is preferably of the thermistor of the type having a negative resistance characteristic. The sensor 52 is mounted proximate to the bridge thyristors on a heat sink 94 in thermal conducting relationship thereto. The inverter switching elements may also be mounted on the same or a similar heat sink in thermal relationship if they are to be thermally protected. A plurality of spaced bridge heat sensors 52 may be employed. In other applications of the invention heat sensors may be used which are responsive to the temperature of a load.

The region heat sensor 50 is comprised of three legs. The first leg contains a conventional on-off thermostat 96. The On state corresponds to the condition where the region 48 temperature has fallen below the thermostat 96 reading and additional heat is required in the region 48. The second leg contains a shunt resistor 98 to provide a resistance which is shorted by thermostat 96 when the thermostat 96 is in the On position. This decreases the combined sensor resistance and causes a decrease in the Royer oscillator frequency. In response thereto the lamps 44 dim and less heat is radiated by the lamps 44 into the region 48. A thermistor similar to circuit heat sensor 52 having a negative resistance temperature coefficient could be employed here, in which case a shunt resistor 98 would not be required. A response slowing capacitor 100 is provided in the third leg across the thermostat 96 to prevent sudden changes in the illumination of region 48. The capacitor 100 slows down the changes in voltage across the heat sensor 50.

Another response slowing capacitor 102 is connected between the output collector of amplifier transistor 78 and the DC supply 74. This capacitor 102 prevents rapid changes in the output voltage of amplifier transistor 78. The capacitor must charge higher or discharge somewhat before the voltage on base lead 86 can change.

The light sensor 46 is preferably a photo cell device in which the resistance decreases as the light supplied thereto increases. The light sensor 46 is disposed in the region 48 which is illuminated by the lamps 44 and by the light from the windows 106 or exterior openings in the enclosure 48 as shown in FIG. 1. The light sensor 46 modulates the intensity of lamps 44 in accordance with variations in the ambient light level due to the varying light contribution of the sun through the windows 104. If the light level or the temperature of the room 48 increases the corresponding sensor resistance decreases and causes a decrease in the operating frequency of the oscillator 26. The lower frequency causes a lower power level in the lamps 44 and the overabundance of light and/or heat is corrected. For instance, suppose a blind on the window 104 provided in the room 48 were opened. The light sensor 46 would respond immediately to the increased light and by means of the oscillator 26 would cause the lights 44 to dim. The heat level of the room is also disturbed by raising the blind. Generally the heat eliminated by dimming the lights 44 is greater than the heat contributed by the sunlight through the window 104 with the raised blind. The glass provided in window 106 transmits the visible sunlight, but reflects the infrared heat from the sun.

Heating problems are seasonal in nature, not enough heat in the winter and too much heat in the summer. Accordingly, the present invention has two modes of operation. A winter mode in which the sensors are connected in series (see FIG. 2) and a summer mode in which the sensors are connected in parallel (see FIG. 3). In the winter it is desirable that the heat sensor 50 dominate because there is generally not enough heat available. Only the heat sensor 50 can detect this condition and increase the power level of the lamps 44. The lower winter temperatures cause the heat sensor 50 to insert higher resistances in the circuit than the light sensor. These two sensors are placed in series so that the more resistive heat sensor 50 will then have the most effect in determining the combined resistance thereof. The dominating high resistance of the heat sensor 50 will then establish a high power level in the lamps 44 and more heat will be produced in the winter.

In the summer it is again desirable that the heat sensor 50 dominate the operation of the power supply because the heat is generally overabundant. Only the heat sensor 50 can detect this condition and must be in control to lower the power level of the lamps 44. The summer heat tends to decrease the resistance of the heat sensor 50. By placing the sensors in parallel as shown in FIG. 3 the least resistive one dominates the more resistive one in determining the combined resistance of the two sensors 46 and 50. The greater the disparity between the parallel resistances, the closer the combined resistance will be to the least resistive one. In the summer, the heat sensor 50 tends to be the least resistive and overwhelms the higher resistive light sensor 46. Accordingly, the power level of the lamps 44 is lowered and less heat is produced by the lamps 44.

It is possible that the demands of the light sensor 46 and the heat sensor 50 might be in direct contradiction. For instance, on a cold, bright winter day the heat sensor 50 will try to increase the power level of the lamp operation to cause more heat to be radiated into the room. While at the same time the light sensor 46 will try to lower the level of operation to reduce the light radiated into the room. As described above in connection with FIG. 3, the heat sensor 50 will dominate. If a brighter light intensity is desired, the frequency control 92 may be adjusted. The frequency control 92 will override either of the sensors to provide a higher power level to the lamps 44.

It will be apparent to those skilled in the art that the objects of the invention have been achieved by providing a power supply circuit having an output power which is a function of the output frequency. The effect of this relation is to eliminate the need for a discriminator circuit. A circuit heat sensor is provided for regulating the temperature of the power supply circuit. Heat and light sensors are provided which cooperate to utilize the lamp load as a heat source as well as a light source for an enclosed space and economize on the cost of heating during the winer. The lamp illumination and the free, low heat content light from the sun are combined to minimize the cooling load during the summer months. The sunlight is also used to advantage to decrease the cost of artificial lighting.

Although this invention has been described with respect to particular embodiments thereof, it is not to be so limited as changes and modifications may be made therein which are within the intended scope of the invention.

We claim:

1. In combination, a temperature-controlled and lighted room, a load device comprising discharge-lamp means and capacitor means in series therewith, and a power supply circuit for energizing said load device with a periodic output current the magnitude of which is a function of the period thereof, the periodic output current of said circuit being regulable in magnitude by varying the period thereof in accordance with varying conditions in said room, said combination comprising:

a unidirectional current source for providing a unidirectional current, and said source having associated therewith a means for adjusting the magnitude of the unidirectional current;

a variable frequency oscillator for providing variable frequency pulses;

polarity reversing switching means having input leads connected to said unidirectional current source to receive the unidirectional current therefrom, and output leads of said switching means connected to said load device, said switching means also electrically connected to said oscillator and responsive to the variable-frequency pulses therefrom for switching the unidirectional current at a predetermined rate to provide the periodic output current from said switching means with a period which is determined by the frequency of the variable-frequency pulses;

current regulator means responsive to the voltage developed across said capacitor means of said load device for controlling said unidirectional current adjusting means to adjust the magnitude of the unidirectional input current to said switching means as a continuous function of the period of the periodic output current from said switching means; and separate temperature and light sensor means continuously responsive to heat and light conditions in said room and connected to said oscillator for controlling the frequency of said oscillator to vary the power level of said circuit automatically in response to changes in temperature and light in said room.

2. The combination as specified in claim 1, wherein said separate temperature and light sensor means, respectively, are responsive to increase in temperature and increase in light in said room to display a decrease in electrical resistance, said separate temperature and light sensor means, respectively, are responsive to decrease in temperature and decrease in light in said room to display an increase in electrical resistance, a control circuit for said variable frequency oscillator including means for manually adjusting the frequency of said variable frequency oscillator, said separate temperature and light sensor means forming a part of said control circuit, a decrease in electrical resistance of said sensor means causing a decrease in the pulse output frequency of said variable frequency oscillator, and an increase in electrical resistance of said sensor means causing an increase in the pulse output frequency of said variable frequency oscillator.

3. The combination as specified in claim 2, wherein a temperature detecting means is positioned proximate said unidirectional current source, said temperature detecting means being responsive to increasing temperature to display a decrease in electrical resistance, and said temperature detecting means is connected in circuit with said separate temperature and light sensor means.

4. In a combined lighting and heating control system for illuminating and heating a predetermined region and for controlling the ambient light intensity and temperature therein, said system comprising;

an enclosure means which includes said predetermined region;

a plurality of discharge devices operable at a variable power level for providing a variable quantity of light and heat for said enclosure, said discharge devices supplying at least in part the energy required to illuminate and heat said enclosure;

a variable frequency output power supply electrically connected to said discharge devices for establishing therein the variable frequency power levels of operation;

light sensing means responsive to the ambient light intensity in said enclosure, said light sensing means electrically connected to said variable frequency output power supply for at least in part controlling the power output of said variable frequency output power supply, to regulate the light intensity within said enclosure;

heat sensing means responsive to the ambient temperature in said enclosure, said heat sensing means electrically connected to said variable frequency output power supply for at least in part controlling the output power of said variable frequency output power supply to regulate the temperature of said enclosure.

5. The control system as specified in claim 4, wherein a means is provided for manually controlling the frequency of said variable frequency output power supply.

6. The system as specified in claim 4, wherein said power supply comprises in combination:

a unidirectional input current source for providing a unidirectional input current and having therein a means for adjusting the magnitude of the unidirectional input current;

a variable frequency oscillator for providing variable-frequency trigger pulses; and output switching means connected to said input current source to receive the unidirectional current therefrom, said output switching means responsive to the variable-frequency trigger pulses for providing a periodic output current which has a frequency determined by the frequency of the variable-frequnecy trigger pulses.

7. The control system as specified in claim 4 wherein said heat sensing means and said light sensing means are electrically connected in series whereby the more resistive of said sensing means dominates their combined output.

8. The control system as specified in claim 4 wherein said heat sensing means and said light sensing means are electrically connected in parallel whereby the least resistive of said sensing means dominates their combined output.

References Cited

UNITED STATES PATENTS

| | | | |
|---|---|---|---|
| 3,341,737 | 9/1967 | Rosa | 307—88.5 |
| 3,111,008 | 11/1963 | Nelson | 307—297 |
| 3,317,789 | 5/1967 | Nuckolls | 315—194 |

JOHN W. HUCKERT, Primary Examiner.

JERRY D. CRAIG, Assistant Examiner.

U.S. Cl. X.R.

219—502; 307—297; 315—158, 194, 308